Patented Apr. 12, 1927.

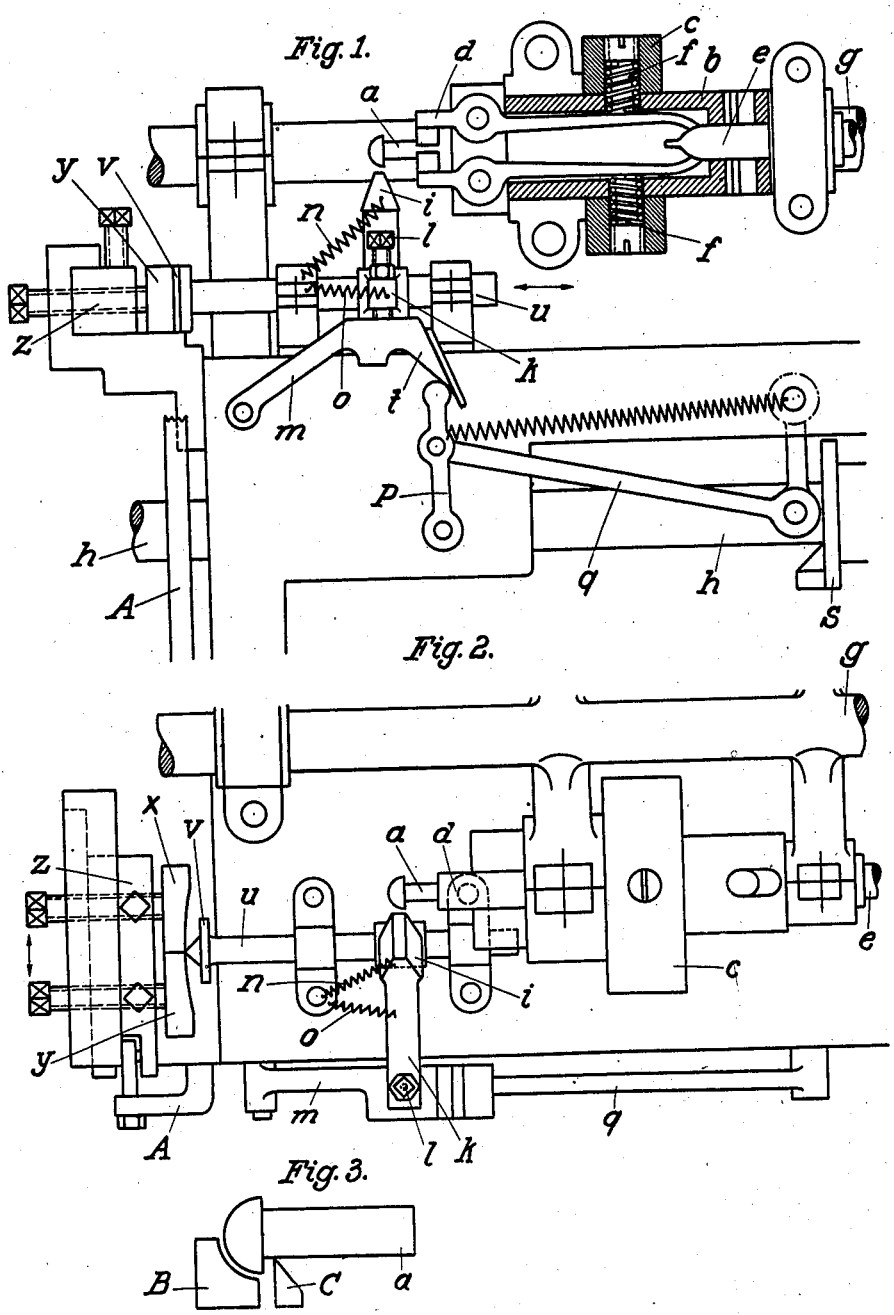

1,624,746

UNITED STATES PATENT OFFICE.

KARL KUMPMANN, OF LUDENSCHEID, GERMANY.

AUTOMATIC MACHINE FOR MAKING THE HEADS OF SLOTTED WOODEN OR IRON SCREWS.

Application filed June 22, 1926, Serial No. 117,821, and in Germany May 7, 1924.

The present invention relates to a machine for making the heads on slotted wooden or iron screws.

Machines of this kind are usually of the automatic type with a special working operation for the profile turning of the head and the slot, whereby the blanks are clamped without change in one and the same blankholder which is connected with a machine shaft situated parallel thereto, the said shaft being accorded a step-by-step part rotation, usually of 180°, as a result of which the blanks are advanced successively to the stationarily mounted turning tools and the slotting saw.

Now the present invention resides in the special embodiment of the part of the machine which produces the heads on the screws. In the case of the hitherto known machine of the type in question it has, in view of the oscillatorily mounted blankholder, been necessary to employ a forming tool conforming with the shape of the head of the screw, the said tool turning the upper and lower faces of the head simultaneously. The making and the re-grinding of the forming tools is a difficult and also expensive matter. The main drawback of these tools resides in the fact that in the case of screw heads which have been irregularly formed preliminarily the latter become wedged in the profiled tool bar and break off, a fact which, in addition to the loss of the tool, also necessitates the machine being stopped for the purpose of removing the old tool and fitting in a new one.

A further disadvantage resides in the fact that the forming tool operates both upon as well as beneath the head simultaneously, so that the cutting area becomes too broad. Neither is it possible to adjust such a self-contained forming tool at the correct cutting angle both upon and beneath the head.

These disadvantages are substantially reduced according to the invention by the fact that for working upon the upper and lower faces of the screw head two cutting tools, joined together, are employed, which by the construction of their cutting faces conform with the shape of the head, i. e., replace a forming tool which is difficult to produce. The same are brought to apply consecutively, for which purpose the tool holder, in addition to its oscillatory motion, transversely to the blank, is accorded an automatic displacement in the axial direction of the blank.

The invention is illustrated by way of example in the accompanying drawing, in which all parts have been omitted not directly appertaining to the invention.

Fig. 1 is a general view, partly in section.

Fig. 2 is a plan, and

Fig. 3 shows the arrangement of the cutting tools in relation to the blank.

The blanks $a$ to be turned are taken in the known manner from a supply chute and fed to a rotary chuck.

The chuck is mounted in the elongated hub $b$ of a belt disc $c$, and consists of a gripping and holding device consisting of a pair of pivoted members, the jaws $d$ of which receive the blank. The gripping device is pressed together by means of a bolt $e$ which, having faces which are tapered in the manner of a wedge, engages between the arms, and is axially displaceable in the hub $b$. The opening of the jaws $d$ is performed after withdrawing bolt $e$ by means of coil springs $f$, which are arranged radially within the belt disc and bear against the long arms of the gripping device.

As disclosed by Fig. 2, the chuck is, in the known manner, supported between two brackets, each being connected by means of a bearing arm with a horizontal shaft $g$ which, is oscillated by 180° at definite intervals.

Upon the operation the belt disc $c$ together with the chuck connected therewith are made to rotate, and the clamped blank $a$ is turned.

The tool holder $i$ carries two separate tools, and in the known manner is oscillatory about a shaft $u$. Towards the rear the tool holder $i$ bears by means of a lever arm $k$ provided with adjustment screw $l$ against a lever $m$, which is mounted transversely thereto and is pivotally secured at the one end to the frame of the machine. By means of springs $n$ and $o$, which engage on the one hand with the shaft frame and on the other hand with the tool holder, the latter is firmly held upon its seating. The lever $m$ bears in turn against an oscillatory support $p$ which, by means of a link $q$ and a cam disc $s$, acts upon an inclined surface $t$ of the lever $m$, and advances or withdraws the tool holder $i$ together with the tools to and from the blank $a$.

The shaft $u$, which is firmly connected with the tool holder $i$, is mounted in a manner capable of axial displacement. The end $v$ of this shaft bears against slides $x$ and $y$, each provided with an inclined face, the shaft being normally held against the slides by the spring $o$. The slides are adjustably secured to a sliding shoe $z$, with which is pivotally connected a lever $A$ which is oscillated by suitable means (not shown). The oscillation of the lever $A$ reciprocates the slides $x$ and $y$, the shaft $u$, in turn, being reciprocated by the inclined faces of the slides, as shown in Fig. 2 by the arrow. On account of the mounting faces of the slides $x$ and $y$ the shaft $u$, and accordingly together therewith the tool holder $i$, is axially displaced in the direction of the arrow. By reason of this axial displacement of the tool holder $i$, it is possible to employ two special tools B and C according to Fig. 3, these tools, due to the axial displacement, being able to work upon the blank $a$ successively, the tool B working on the curvature of the head, and the tool C on the flat face.

Naturally, sunk heads or any other desired form of head may be turned, the shape and position of the tools being determined by the shape of the head.

What I claim as new and desire to secure by Letters Patent is:

1. An automatic machine for making the heads of slotted screws, comprising a rotary machine head in which the blank is clamped, a tool holder mounted on the machine frame and oscillatory towards the blank, an oscillatory lever mounted on the said machine frame, the said lever having an inclined bearing surface, a second lever on the machine frame cooperating with the said bearing surface, means for periodically displacing the said second lever and thus lifting the said oscillatory lever, and two cutting tools mounted in the said holder, the one of the said tools working upon the upper face of the screw head, and the other upon the lower face.

2. An automatic machine for making the heads of slotted screws, comprising a rotary machine head in which the blank is clamped, a tool holder mounted on the machine frame, the said tool holder being oscillatory towards the blank and displaceable in an axial direction, means for periodically advancing the said tool holder towards the blank, means for periodically displacing the said tool holder parallel to the blank, and two cutting tools mounted in the said tool holder, the said tools being arranged side by side at such a distance apart that the said tools are always applied to the blank consecutively.

In testimony whereof I have affixed my signature.

KARL KUMPMANN.